Sept. 30, 1969   E. PERSSON ET AL   3,470,383
DEVICE FOR MEASURING THE WIDTH OF GLOWING
OBJECTS BY SCANNING WITH A PHOTOCELL
Filed Aug. 14, 1967                         3 Sheets-Sheet 1

INVENTOR.
ERIK PERSSON    NILS-ERIK CLAESSON
INGVAR TRULSSON    OSVALD MELANDSOR
BY
Jennings Bailey, Jr Sept. 30, 1969    E. PERSSON ET AL    3,470,383
DEVICE FOR MEASURING THE WIDTH OF GLOWING
OBJECTS BY SCANNING WITH A PHOTOCELL
Filed Aug. 14, 1967    3 Sheets-Sheet 2

ERIK PERSSON       NILS-ERIK CLAESSON  INVENTOR.
INGVAR TRULSSON    OSVALD MELANDSOR
                BY

United States Patent Office 3,470,383
Patented Sept. 30, 1969

3,470,383
DEVICE FOR MEASURING THE WIDTH OF GLOWING OBJECTS BY SCANNING WITH A PHOTOCELL
Erik Persson, Nils-Erik Claesson, Ingvar Trulsson, and Osvald Melandsör, Vasteras, Sweden, assignors to Allmanna Svenska Elektriska Aktiebolaget, Vasteras, Sweden, a corporation of Sweden
Filed Aug. 14, 1967, Ser. No. 660,494
Claims priority, application Sweden, Aug. 12, 1966, 10,915/66
Int. Cl. G01n 21/30
U.S. Cl. 250—219                                                    9 Claims

ABSTRACT OF THE DISCLOSURE

A device for measuring the width of glowing objects comprises a rotating plane mirror or a drum provided with a slot, which is positioned in the focus of a concave mirror or lens, and a photocell with a narrow field of view. When the mirror or drum is rotated a periodic scanning motion is obtained across the object and pulses or signals are emitted from the photocell when the field passes the borders of the object, which pulse or pulses may be used for measuring the width of the scanned object.

BACKGROUND OF THE INVENTION

Field of the invention

The present invention relates to a means for measuring the width or thickness of glowing objects, for example in hot-rolling mills, which means comprises a photocell and a rotating, preferably flat mirror or the like provided to periodically scan a wide measuring range with a narrow field of view from the photocell.

The prior art

There are many advantages of the known means. It is possible to utilize the rays of the object itself and thus avoid the necessity of illuminating the object. Parts touching the object are avoided and the advantages of the narrow field of view (distinct position-signals) can be combined with those of the large measuring range. However, a considerable disadvantage with such known means is its dependence on the distance of the object. Thus differing position-signals may be obtained at different distances although the width of the object to be measured remains unchanged, which in turn may cause control or measuring faults.

SUMMARY OF THE INVENTION

The invention relates to a device with which said disadvantages and others are solved and this new device is characterised in that the centre of the rotating mirror or slotted drum is positioned substantially at the focal point of a concave mirror or a lens towards which the field of vision of the rotating mirror or drum is directed, so that after reflection or refraction the field of view will be substantially parallel to the axis of the mirror/lens as well as the rays falling within the field of view. By means of this the field of view of the photocell after reflection will run parallel to the axis of the concave mirror or lens and the position of the object indicated in the photocell will thus be independent of the distance between photocell and object.

BRIEF DESCRIPTION OF THE DRAWINGS

The device according to the invention is further exemplified below.

DESCRIPTION OF THE PREFERRED EMBODIMENTS

Figure 1:
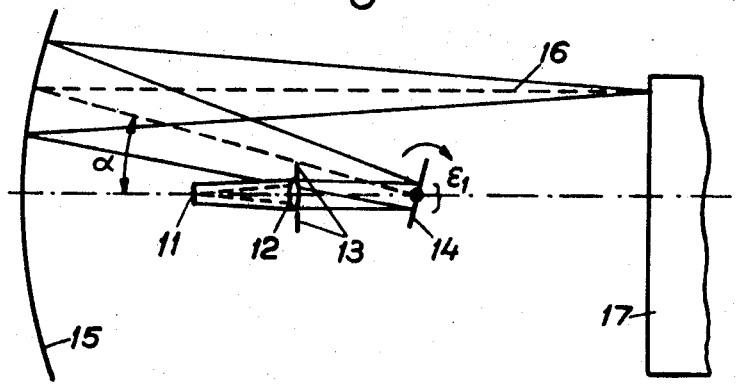
FIGURES 1 and 3 show a photocell with a rotating plane mirror and a reflecting parabolic or spherical mirror.

In FIGURE 1, 11 indicates a photocell with a stationary lens 12, distinctly screened at 13 in order to limit the field of view of the photocell 11. The lens projects onto a rotating flat mirror 14 a picture of the photocell and the photocell is focused on the rays falling on the mirror 14. Both the photocell and the centre of rotation of the mirror 14 are placed on the axis of the lens 12.

The rotating flat mirror 14 is placed in the focal point of a parabolic or spherical mirror 15. The mirror may also be cylindrical or flat-parabolic, but in that case the lens 12 must be a double cylinder-lens. The field of vision 16 of the photocell, when the flat mirror rotates, will be moved parallel to the central axis of the mirror 15 and the position indicated for an object 17 will be independent of the distance of the object 17 from the mirror 15. In order to obtain a sharp reproduction of the measurement $e_1$ of the photocell on the mirror 14 it is necessary that $$\frac{1}{f_1} = \frac{1}{b} + \frac{1}{c}$$

where $f_1$ is the focal length of the lens 12, $b$ the distance lens—flat mirror and $c$ the distance lens—photocell. Complete clearness for the distance $a$ can be obtained, namely for $$\frac{1}{f} = \frac{1}{a} + \frac{1}{f+b}$$

where $f$ is the focal length of the mirror 15, which means that the sapce at the double cylinder-lens is clearly reproduced upon the object 17 when this is located at the distance $a$ from the mirror. However, it is obvious that a variation in the distance from $a$ does not cause less accuracy and within certain limits a more or less exact reproduction of the width of the object and thus its edge is obtained in the photocell 11.

Figure 2:
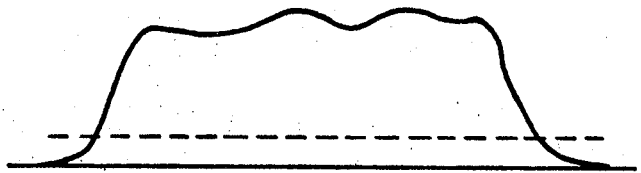
FIGURE 2 shows an indication curve.

FIGURE 2 shows the output signal from the photocell which is supplied to a circuit (not shown) to obtain front and back edge pulses. Preferably the time should be indicated when the signal on the way up or down passes a certain level (dotted line in FIGURE 2), in relation to starting level.

As seen in FIGURE 1 if the field of vision and mirror axis were not parallel the signal from the photocell 11 would be dependent on the distance between the object 17 and mirror 15.

Figure 3:
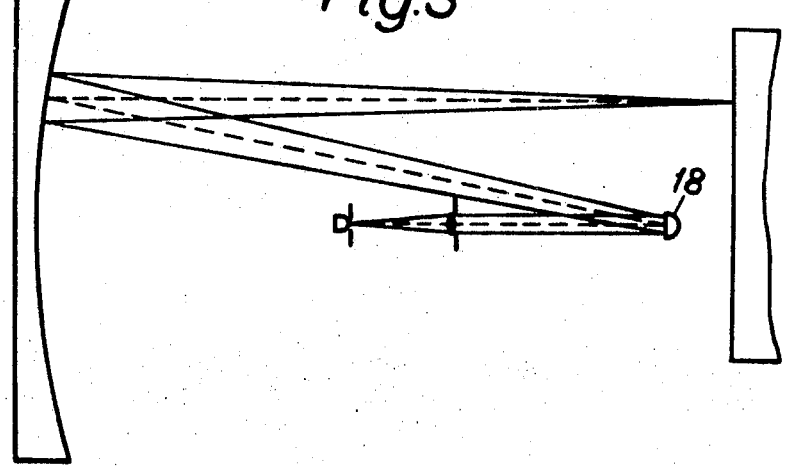
Figure 4:
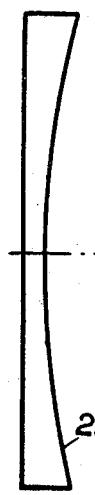
FIGURES 4 and 5 show an embodiment with a rotating drum with photocell and FIGURE 6 a device with rotating drum and cylinder lens.
Figure 4:
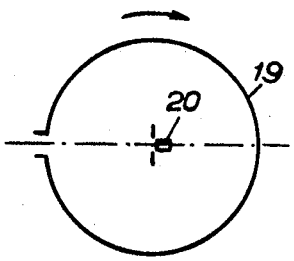
Figure 5:
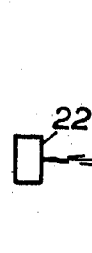
Figure 5:
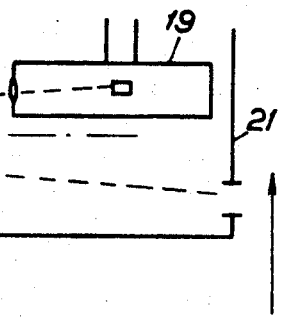
Figure 6:
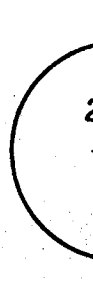
Figure 6:
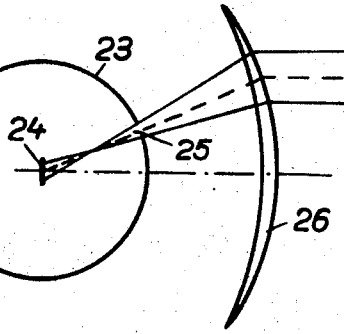
Figure 6:
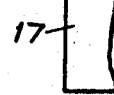

FIGURE 3 shows how a mirror 18 is mounted in the centre of an axis. FIGURE 4 shows an embodiment where the periodic scanning of the field of vision is carried out by a rotating, slotted drum 19 of light-absorbing material. At the centre of the drum is placed a photocell 20 and the angle $\alpha$ between the field of vision at the drum and the axis will provide a measurement of the position of the front and back edges of the object and from these signals (time difference) the width of the object can also be attained. FIGURE 5 shows in horizontal projection how the drum must be axially displaced in relation to the normal of the mirror 22 in order not to screen rays coming from the object. A corresponding displacement of the rotating mirror 14, the lens 12 and the photocell 11 is also necessary in the alternative according to FIGURE 1. FIGURE 6 shows a rotating drum 23 (which may be replaced by rotating flat or cylindrical mirror). As with the drums in FIGURES 4 and 5, the drum is here provided with a slot 25, the width of which determines the width of the field of vision. The arrangement is provided with a cylindrical lens 26, the centre of the drum and the photocell 24 being placed in its focal point. Parallel rays from the object 17 to the lens are refracted at the focal point and when the drum rotates a periodic scanning is obtained of the front and back edges of the object, and from the time difference between these pulse a gauge of the width or identity of the object can be obtained.

Figure 7:
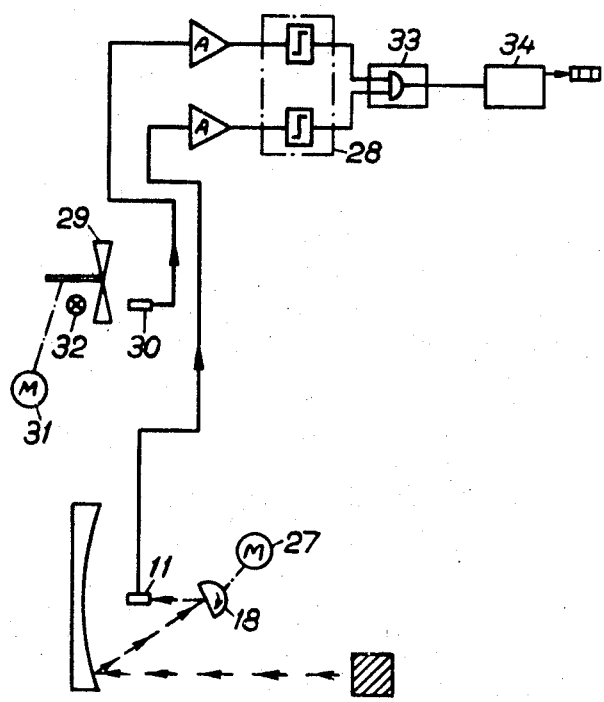
FIGURE 7 shows a more detailed diagram of a thickness gauge of the type shown in FIGURE 3.

FIGURE 7 shows a rotating mirror 18 driven by a synchronous motor 27. Pulses of the type shown in FIGURE 2 are sent from the photocell 11 to an amplifier and then to a pulse-converter 28 of known type, which converts the pulses from the amplifier to rectangular pulses, either a short pulse at the passage of the front edge and one at the passage of the back edge or a continuous rectangular pulse while the scanning field passes the object. From a pulse emitter, for example a hole-disc 29 driven by a synchronous motor 31 fed from the same network as the motor 27 (or the above-mentioned synchronous motor 27), and a light source 32 shining towards the photocell 30, pulses are sent to an amplifier whose output time is connected to a pulse-converter 28. From the pulse-converter 28 measuring and reference pulses are transmitted to a gate 33 and upon the occurrence of signals in both circuits, that is when the scanning field is passed by a glowing object, pulses are transmitted from the pulse-emitter 29–32 to a counter 34 of known type. The numerical value calculated in the counter thus corresponds to the width of the object. When the scanning field leaves the object the signals from 11 cease and the pulse series from the emitter is blocked at 33. The mirror 18 may of course be replaced by the mirror 14 in FIGURE 1, or by the arrangements according to 19–20, 16 or 23–25 in FIGURES 4–6.

The means according to the invention can be varied in many ways within the scope of the following claims. Thus, as the optical means mirror and/or lens combinations may be used with which parallel rays are reflected or refracted to the focal point. With good lighting it is also possible to use the invention with non-glowing bodies, such as objects for cold-rolling mills, paper machines, or the like.

The term light-deflecting member as used in the claims is intended to include a mirror or a lens.

We claim:
1. A device for measuring the width of glowing objects comprising a photocell, a concave light-deflecting member with a width in the scanning direction greater than that of the photocell, said photocell being located on the concave side of said light-deflecting member, and means to scan the concave side of said light-deflecting member in such a manner that the measuring field of the photocell by means of the scanning means is periodically moved along a line perpendicular to the axis of symmetry of the concave side of said light-deflecting member after deflection against said member, said line having a length substantially limited by the measuring fields reflected against the extreme parts of said member, the scanning means including means to transmit to the photocell rays deflected at said light-deflecting member coming from an object, whereby the dimension of said object positioned within said measuring line can be determined by measuring the time when rays from said object are firstly and finally thrown upon said measuring photocell during a scanning period.

2. A measuring device as claimed in claim 1, in which said light-deflecting member is a mirror.

3. A measuring device as claimed in claim 1, in which said light-deflecting member is a lens.

4. A measuring device as claimed in claim 1, in which the scanning means includes a rotating mirror directed towards the light-deflecting member.

5. A measuring device as claimed in claim 4, in which the light-deflecting device is a mirror.

6. A measuring device as claimed in claim 5, in which the mirror is located substantially at the focus of the light deflecting member.

7. A measuring device as claimed in claim 1, in which the scanning device includes a rotatable slotted drum enclosing the photocell.

8. A measuring device as claimed in claim 1 having means connected to the scanning means to emit pulses in response to the encounter by the scanning means of edges of an object being scanned.

9. A measuring device as claimed in claim 8, including a pulse counter connected to the pulse emitting means and including means responsive to the presence or absence of pulses to operate the pulse counter.

References Cited

UNITED STATES PATENTS

| | | |
|---|---|---|
| 2,237,811 | 4/1941 | Cockrell. |
| 2,410,550 | 11/1946 | Padva. |
| 2,997,598 | 8/1961 | Gramm _____ 250—236 |
| 3,033,991 | 5/1962 | Sampson. |
| 3,234,844 | 2/1966 | Fain _____ 250—235 |

FOREIGN PATENTS

| | | |
|---|---|---|
| 157,502 | 10/1962 | U.S.S.R. |
| 381,485 | 10/1932 | England. |

OTHER REFERENCES

Fundamentals of Optics, Jenkins and White, 1950, McGraw-Hill Book Co., pp. 36–37.

RALPH G. NILSON, Primary Examiner

C. M. LEEDOM, Assistant Examiner

U.S. Cl. X.R.

250—235, 236; 356—160